United States Patent [19]

Schilplin et al.

[11] Patent Number: 5,033,790
[45] Date of Patent: Jul. 23, 1991

[54] SEAT POST ASSEMBLY

[76] Inventors: Frederick C. Schilplin, Rte. 3, Annandale, Minn. 55302; Brian L. Anderson, 425 Whisper Hollow Ct., Lawrenceville, Ga. 30243

[21] Appl. No.: 578,639

[22] Filed: Sep. 6, 1990

Related U.S. Application Data

[63] Continuation-in-part of Ser. No. 389,751, Aug. 4, 1989, abandoned, which is a continuation of Ser. No. 256,660, Oct. 12, 1988, abandoned, and Ser. No. 282,603, Dec. 12, 1988, abandoned.

[51] Int. Cl.$^5$ .............................................. B62J 1/00
[52] U.S. Cl. ........................................ 297/195; 403/87
[58] Field of Search ............... 297/195, 156, 313; 248/231.9, 231.91, 231.2; 403/104.87, 297, 391, 296, 374; 411/24, 25, 26, 79, 80; 80/281 R

[56] References Cited

U.S. PATENT DOCUMENTS

| 323,022 | 7/1885 | Boone | 411/24 X |
|---|---|---|---|
| 575,184 | 1/1897 | Voelker | 297/195 X |
| 578,399 | 3/1897 | Garford | 297/195 X |
| 2,710,207 | 6/1955 | Mueller | 297/195 X |
| 3,891,333 | 6/1975 | Cordorac'k | 297/195 X |
| 4,095,911 | 6/1978 | Lacroix | 403/104 |
| 4,142,813 | 3/1979 | Laborde | 403/87 X |
| 4,155,590 | 5/1979 | Cunningham | 403/87 X |
| 4,421,357 | 12/1983 | Shamano | 403/87 X |
| 4,440,440 | 4/1984 | Juy | 297/195 |
| 4,502,811 | 3/1985 | Patriarca | 297/195 X |
| 4,693,627 | 9/1987 | Borromeo | 297/195 X |
| 4,783,119 | 11/1988 | Moses | 297/195 |
| 4,789,177 | 12/1988 | Mueller | 297/195 X |
| 4,836,604 | 6/1989 | Romano | 403/87 X |

FOREIGN PATENT DOCUMENTS

| 2247003 | 8/1974 | Fed. Rep. of Germany | 411/24 |
|---|---|---|---|
| 53-48220 | 5/1978 | Japan | 297/195 |
| 30966 | 8/1920 | Norway | 403/374 |
| 992542 | 5/1965 | United Kingdom | 411/80 |

Primary Examiner—Jose V. Chen
Attorney, Agent, or Firm—Douglas B. Farrow

[57] ABSTRACT

A bicycle seat post clamping assembly is formed from a simple tube attached perpendicularly to the top of a seat post. A clamping member is formed from a cylindrical member which is separated into three portions by two cuts, each of which runs from one end of the cylindrical piece to the circumference adjacent the center. Grooves in the main portion accommodate the rails of the seats and a fastening member serves to draw the three pieces together thus wedging them into the tube attached to the top of the seat post thereby allowing ease of adjustment of the angle of the seat as well as the fore and aft positioning thereof.

17 Claims, 3 Drawing Sheets

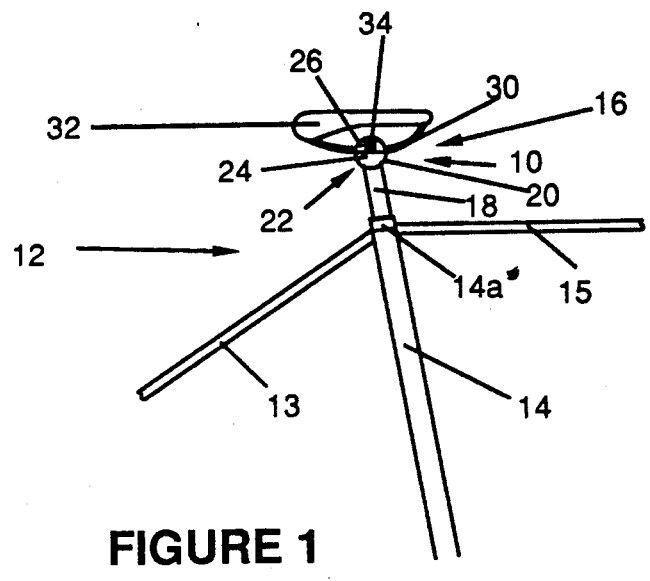
FIGURE 1
FIGURE 2
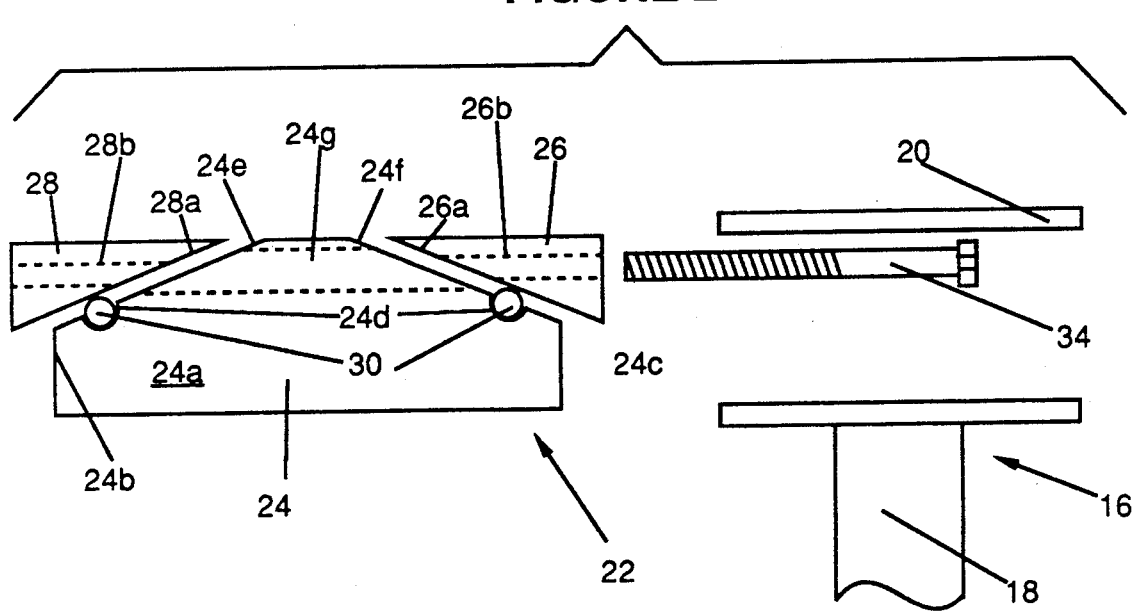

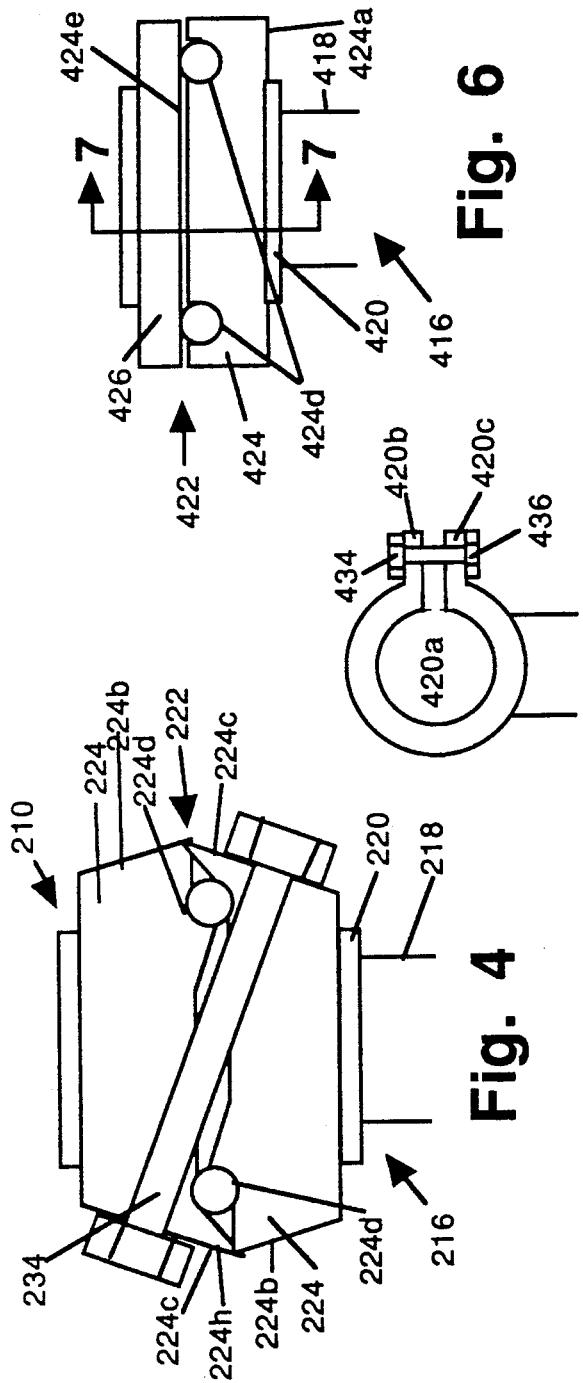
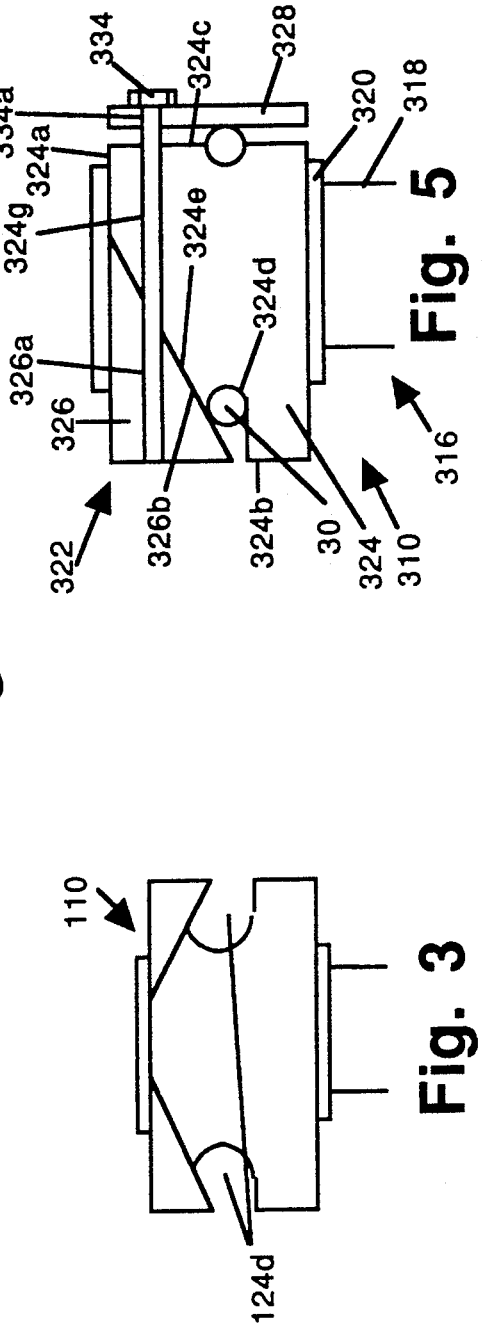

SEAT POST ASSEMBLY

RELATED APPLICATIONS

This application is a continuation-in-part of U.S. patent application Ser. No. 389,751, filed Aug. 4, 1989 which is a continuation of U.S. patent application Ser. Nos. 256,660, filed Oct. 12, 1988, and 282,603, filed Dec. 12, 1988, all abandoned.

BACKGROUND OF THE INVENTION

As in most accessories designed for bicycle use, seat post clamps for attaching the seat to the seat post have heretofore been formed of a complicated casting which is relatively complicated and expensive to manufacture and which is not all that easily adjusted by the owner/rider. Such clamps are typified by the construction shown in U.S. Pat. No. 4,142,813.

It is therefore an object of this invention to provide a seat post clamp which is easily and inexpensively manufactured. It is further an object of this invention to provide a seat post assembly which may easily be adjusted by the rider and which may be easily and inexpensively manufactured from common materials and parts.

SUMMARY OF THE INVENTION

In the instant invention, a simple piece of round tubing referred to as a clamp tube is welded or otherwise permanently attached perpendicularly to the top of the seat post. A piece of cylindrical rod having a diameter slightly less than the inside diameter of the clamp tube is sliced into three sections. This construction is shown in more detail in the commonly assigned pending application U.S. Ser. No. 256,660, the contents of which are hereby incorporated by reference.

Two wedge-like clamping sections are formed by making two cuts, each of which runs from the circumference adjacent the center of the rod to terminate in the end near the diameter of the rod, thus forming two wedge-like clamping sections and a main section. The three pieces are then axially drilled and have a bolt threaded through them, the holes having a slightly larger diameter than that of the bolt. Two parallel grooves generally perpendicular to the axis are provided in the cut surfaces on the main section for accommodating the two parallel rails of the seat.

Thus, when a bolt is placed through all three sections and tightened, the seat rails will be tightened and clamped between the main section and the clamping sections and the wedging action of the clamping pieces moving inwardly on the main section will cause the effective outer circumference of the cylindrical rod to expand and grip the inside of the clamping tube atop the seat post. Accordingly, by slightly loosening the bolt, both the angle of the seat and the fore-aft position of the seat may be easily adjusted.

In an alternative embodiment of the instant invention, a two piece clamping assembly is made of identical parts and is drawn together by a bolt thereby trapping the seat rails therebetween and expanding the clamping assembly to grip the inside of the clamping tube.

In another alternative embodiment of the instant invention, a two piece clamping assembly clamps the seat rails therebetween. The clamping tube has a longitudinally oriented split and suitable clamping mechanism which decreases the ID of the clamping tube to grip the clamping assembly. An annular tube or arcuate member formed of a relatively soft material may be placed between the clamp assembly and the clamp tube to assist in firm gripping.

In another alternative embodiment of the instant invention, a single wedge clamping assembly clamps the seat rails therebetween with the assistance of a keeper at the non-wedge end and is drawn together by a bolt thereby trapping the seat rails therebetween and expanding the clamping assembly to grip the inside of the clamping tube.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 shows a plan view of the instant invention on a bicycle.

FIG. 2 shows an exploded view of the instant invention.

FIG. 3 shows an alternative embodiment of the instant invention.

FIG. 4 shows an alternative embodiment of the instant invention.

FIG. 5 shows an alternative embodiment of the instant invention.

FIG. 6 shows an alternative embodiment of the instant invention.

FIG. 7 shows a cross-sectional view of the clamping tube of FIG. 6.

DESCRIPTION OF THE PREFERRED EMBODIMENT

Figure 8:
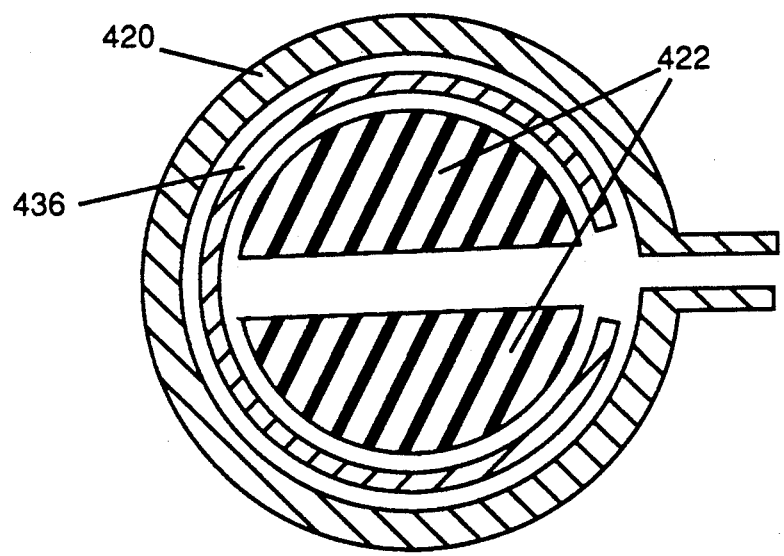
FIG. 8 shows an alternative embodiment of FIG. 6 and 7 embodiment.

The instant invention shown in FIGS. 1 and 2, generally designated 10, is shown atop a bicycle 12 having a seat tube 14 with a clamp 14a at the top thereof. Seat tube 14 is supported by seatstay tube 13 and top tube 15. Inserted into seat tube 14 is a seat post member 16 comprised of a seat post 18 and a clamping tube 20 which is attached perpendicularly to the top of seat post 18 by welding or other conventional joining technique.

Clamping assembly 22 is formed from a piece of cylindrical rod which is cut into three sections: main section 24 and a clamping sections 26 and 28.

As can be seen in FIG. 2, the two cuts run from each end (24b and 24c of main section 24) to the circumference 24a of main section 24 adjacent the center thereof. Two grooves 24d are formed in surfaces 24e and 24f to accommodate and clamp seat rails 30 of seat 32.

A bolt or other fastening member 34 is inserted through holes 28b, 24g and 26b in second clamping member 28, main clamping member 24 and second clamping member 26 respectively (hole 28b being threaded). At least hole 24g has a diameter greater than that of bolt 34 so that when bolt 34 is tightened, the wedging action of clamping sections 26 and 28 on main section 24 serves to clamp seat rails 30 in grooves 24d and also serves to expand the outer diameter of clamping assembly 22 to snugly engage the inside of clamping tube 20 thereby fixing the angle of seat 32 relative to seat tube 18 as well as the fore-aft position of the seat relative to the seat tube and the bicycle frame. Hole 24g may also have a cross-section of an upwardly facing U-shaped slot such that the open side of the slot extends through the upper surface of main section 24.

The alternative embodiment 110 shown in FIG. 3 is quite similar to the FIG. 1 and 2 embodiment and operates in a generally similar fashion with the exception the slots 124d open more axially outwardly rather than upwardly.

Another alternative embodiment of the instant invention is shown in FIG. 4 and is generally designated 210. Inserted into seat tube 14 (of a conventional bicycle such as that shown in FIG. 1 is a seat post member 216 comprised of a seat post 218 and a clamping tube 220 which is attached perpendicularly to the top of seat post 218 by welding or other conventional joining technique.

Clamping assembly 222 is formed from two (desirably) identical members 224 which are formed by machining, casting, forging or other conventional manufacturing techniques. Each member 224 has a rail slot end 224b and a wedge end 224c along with a circumference 224a. A slot 224d is formed in rail slot end 224b to accommodate and clamp seat rails 30 of seat 32.

A bolt or other fastening member 234 is inserted through holes 224g in first and second clamping members 224 (hole 224g in one of the members may be threaded if desired rather than utilizing a nut 236). When bolt 234 is tightened, the wedging action of wedge sections 224h on seat rails 30 in grooves 224d clamps seat rails 30 and also serves to expand the outer diameter of clamping assembly 222 to snugly engage the inside of clamping tube 220 thereby fixing the angle of seat 32 relative to seat tube 18 as well as the fore-aft position of the seat relative to the seat tube and the bicycle frame.

Another alternative embodiment of the instant invention is shown in FIG. 5 and is generally designated 310. Inserted into seat tube 14 (of a conventional bicycle such as that shown in FIG. 1 is a seat post member 316 comprised of a seat post 318 and a clamping tube 320 which is attached perpendicularly to the top of seat post 318 by welding or other conventional joining technique.

Clamping assembly 322 is formed from three members. Main member 324 is generally cylindrical in nature and a portion is cut off (or formed by other conventional manufacturing techniques) to produce wedge 326. Member 324 has a rail slot end 324b and and a keeper end 324c along with a circumference 324a. Slots 324d are formed in rail slot end 324b and keeper end 324c to accommodate and clamp seat rails 30 of seat 32. Keeper 328 can be formed from a washer or similar piece.

A bolt or other fastening member 334 is inserted through holes 334g, 324g and 326a in keeper 328 and clamping members 324 and 326 respectively (hole 326a in member 326 may be threaded if desired). When bolt 334 is tightened, the wedging action of wedge sections 326b on wedge 324e clamps one of seat rails 30 in one groove 324d while keeper 328 clamps the other seat rail 30 into the other slot 324d and also serves to expand the outer diameter of clamping assembly 322 to snugly engage the inside of clamping tube 320 thereby fixing the angle of seat 32 relative to seat tube 18 as well as the fore-aft position of the seat relative to the seat tube and the bicycle frame.

Another alternative embodiment of the instant invention is shown in FIGS. 6 and 7 and is generally designated 410. Inserted into seat tube 14 (of a conventional bicycle such as that shown in FIG. 1 is a seat post member 416 comprised of a seat post 418 and a clamping tube 420 which is attached perpendicularly to the top of seat post 418 by welding or other conventional joining technique. An axially directed slot 420a is cut along one side of tube 420 and has located on either side thereof ears 420b and 420c. This construction may also be formed by making clamping tube 420 as an extrusion.

Clamping assembly 422 is formed from two members 424 and 426 which are formed by machining, casting, forging or other conventional manufacturing techniques. Member 424 has a circumference 424a and two slots 424d are formed in face 424e to accommodate and clamp seat rails 30 of seat 32. Keeper 426 completes the clamping assembly and is formed by slicing off a portion of member 424 or otherwise.

A bolt or other fastening member 434 is inserted through ears 420b and 420c in clamping tube 420 (the hole in one of the ears may be threaded if desired or a nut 436 may be utilized). When bolt 434 is tightened, seat rails 30 are clamped between member 424 and keeper 426 in grooves 424d. This also serves to contract the inner diameter of clamping tube 420 to snugly engage the outside of clamping assembly 422 thereby fixing the angle of seat 32 relative to seat tube 18 as well as the fore-aft position of the seat relative to the seat tube and the bicycle frame.

The FIG. 8 embodiment is similar to that of FIGS. 6 and 7 except that it has a gripping member 436 which may be either tubular or arcuate extending around most of the circumference of clamping assembly 422 and inside of clamping tube 420. Forming gripping member 436 of a relatively soft material such as T4 6061 aluminum or polyurethane and knurling (or similar treatment of) the inner surface of clamping tube 420 and the outer surface of clamping assembly 422 allows enhanced gripping. The term relatively hard is used for sake of comparison to the materials used to form clamping assembly 422 and clamping tube 420 which are made of a harder grade of aluminum such as 6061 T6 or the like. For instance, clamping tube 420 may have a nominal ID of 1.25 inches while clamping assembly 422 may have a nominal OD of 1.125 inches. The gripping member 436 is then formed of a material approximately 1/16 inch thick.

It is contemplated that various changes and modifications may be made to the seat post clamp assembly without departing from the spirit and scope of the invention as defined by the following claims.

What is claimed is:

1. A seat post clamp assembly in combination with a seat having generally parallel longitudinal mounting rails, said assembly comprising:
   a seat post comprising:
      a post tube; and
      a clamp tube having an axis and attached to one end of said post perpendicularly thereto;
   a clamp assembly located substantially in said clamp tube and formed from a generally cylindrical piece of material having a circumference and a center, said piece being cut into a main and two clamping sections by first and second cuts, each of said cuts cutting obliquely through said cylindrical piece and forming planar surfaces passing through one end of said piece and terminating at the circumference of said piece adjacent the center of said piece said clamping assembly having an effective diameter, said main and clamping sections being positioned relative to one another to form generally the same shape as the cylindrical piece from which said sections were cut; and means for clamping said sections axially together in said clamp tube to increase the effective diameter of said clamping assembly by causing said sections to wedgingly interact.

2. The seat post clamp assembly of claim 1 wherein the planar surfaces on said main section formed by said cuts each comprise a groove formed therein receiving said seat mounting rails.

3. The seat post clamp assembly of claim 2 wherein said clamping means comprises bolt means passing axially through said sections.

4. The seat post clamp assembly of claim 2 wherein said grooves are generally perpendicular to the axis of said clamping tube.

5. A seat post clamp assembly in combination with a bicycle having a seat tube for receiving a seat post and a seat having generally parallel longitudinal mounting rails, said assembly comprising:
 a seat post comprising:
  a post adjustably mountable in said seat tube; and
  a clamp tube having an axis and attached to one end of said post perpendicularly thereto;
 a clamp assembly located substantially in said clamp tube and formed from a generally cylindrical piece of material having a circumference and a center, said piece being cut into main and keeper clamping sections with a cut, said cut forming a plane passing through one end of said piece and terminating at the circumference of said piece adjacent the center of said piece, said clamping assembly having an effective diameter, said main and keeper sections being positioned relative to one another to form generally the same shape as the cylindrical piece from which said sections were cut; and
 means for clamping said sections axially together in said clamp tube to increase the effective diameter of said clamping assembly by causing said sections to wedgingly interact.

6. The seat post clamp assembly of claim 5 wherein the planar surface on said main section formed by said cut comprises a groove formed therein for receiving one of said seat mounting rails.

7. The seat post clamp assembly of claim 6 wherein said clamping means comprises bolt means passing axially through said sections.

8. The seat post clamp assembly of claim 7 further comprising a second groove, wherein said grooves are generally perpendicular to the axis of said clamping tube.

9. A seat post clamp assembly in combination with a bicycle having a seat tube for receiving a seat post and a seat having generally parallel longitudinal mounting rails, said assembly comprising:
 a seat post comprising:
  a post; and
  a one piece clamp tube having first and second ends and an inner diameter and attached to one end of said post generally perpendicularly thereto having means for contracting the inner diameter of said clamp tube;
 a clamp assembly located substantially in said clamp tube and receiving said seat rails and comprising first and second members, at least one of said members having grooves for receiving said seat rails therebetween, said clamp assembly forming generally a longitudinally split cylinder having a consistent outer diameter and received in and insertable completely through said clamp tube ends to extend at least partially from each of said tube ends, said outer diameter being at all locations slightly less than said inner diameter of said clamp tube when said clamping tube is in a relaxed state so that when said contracting means decreases the inner diameter of said clamp tube, said inner diameter grips said outer diameter and said seat rails are clamped in said grooves between said first and second members, said grooves being located outside of said tube ends and adjacent thereto.

10. The seat post assembly of claim 9 wherein said clamping tube comprises a split in one side.

11. The seat post assembly of claim 10 wherein said means for contracting said inner diameter comprises a flange on either side of said split and fastening means for adjusting the distance between said flanges.

12. The seat post clamp assembly of claim 9 further comprising an arcuate gripping member located between said clamp tube and said clamp assembly.

13. The seat post clamp assembly of claim 12 wherein said gripping member is formed of a relatively soft material compared to said clamp tube and said clamp assembly.

14. The seat post clamp assembly of claim 13 wherein said gripping member is formed of T4 6061 aluminum.

15. The seat post clamp assembly of claim 13 wherein said gripping member is formed of polyurethane.

16. The seat post clamp assembly of claim 12 wherein the outer diameter of said clamp assembly is at least partially knurled.

17. The seat post clamp assembly of claim 12 wherein the inner diameter of said clamp tube is at least partially knurled.

* * * * *